(12) United States Patent
Amirouch et al.

(10) Patent No.: US 9,816,623 B2
(45) Date of Patent: Nov. 14, 2017

(54) HIGH-FLOW VALVE ARRANGEMENT IN STEAM TURBINE SAFETY SYSTEM

(71) Applicant: Alstom Technology Ltd.

(72) Inventors: Nizar Amirouch, Evreux (FR); Victor Da-Cruz, Villeneuve le roi (FR); Jean-Marc Lop, Drancy (FR)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 15/142,476

(22) Filed: Apr. 29, 2016

(65) Prior Publication Data
US 2016/0319939 A1    Nov. 3, 2016

(30) Foreign Application Priority Data

Apr. 30, 2015   (EP) .................................... 15290123

(51) Int. Cl.
*F16K 1/36*      (2006.01)
*F16K 31/122*    (2006.01)
(Continued)

(52) U.S. Cl.
CPC .............. *F16K 1/36* (2013.01); *F16K 31/124* (2013.01); *F16K 31/1221* (2013.01); *F16K 31/1223* (2013.01); *F01D 21/18* (2013.01)

(58) Field of Classification Search
CPC .... F16K 1/36; F16K 31/1223; F16K 31/1221; F16K 31/124; F01D 21/18; Y10T 137/86759; Y10T 137/86791
See application file for complete search history.

(56) References Cited

U.S. PATENT DOCUMENTS 1,630,973 A * 5/1927 Schmidt .................... F16K 1/02
                                              137/625.33
3,495,501 A * 2/1970 Kure-Jensen ........... F01D 21/18
                                              91/396
(Continued)

FOREIGN PATENT DOCUMENTS

BE        782289 A1   8/1972
FR       2314997 A1   1/1977

OTHER PUBLICATIONS

European Search Report issued in connection with EP application 15290123.7 dated Oct. 7, 2015.

*Primary Examiner* — Eric Keasel
(74) *Attorney, Agent, or Firm* — GE Global Patent Operation; Cynthia W. Flanigan

(57) ABSTRACT

A high-flow valve arrangement in an electro-hydraulic safety control unit to discharge oil volume on instructions from a steam turbine safety system to actuate actuators to stop steam flow in steam turbines to shut-off, is provided. The valve includes a valve body with a flange having a plurality of spaced-apart through holes, a flat-circular plate cartridge and a valve housing configured to each other. The housing includes a chamber to accommodate oil volume; an inlet/outlet port to enable the oil volume to enter and exit therefrom, and a peripheral seat where the cartridge seats. The plate cartridge is capable of being moved upward, defining a very small stroke, upon the increase or decrease of the oil volume in the chamber to open and close the outlets defined via the plurality of spaced-apart through holes to enable and stop the fluid flow therefrom.

3 Claims, 5 Drawing Sheets

(51) Int. Cl.
*F16K 31/124* (2006.01)
*F01D 21/18* (2006.01)

(56) References Cited

U.S. PATENT DOCUMENTS

| | | | | |
|---|---|---|---|---|
| 4,103,592 A | | 8/1978 | Davis | |
| 4,343,454 A | * | 8/1982 | Kure-Jensen | F01D 17/26 251/26 |
| 4,585,205 A | * | 4/1986 | Coppola | F01D 21/18 251/26 |
| 5,280,807 A | * | 1/1994 | Frey | F01D 21/18 137/556 |
| 5,435,227 A | * | 7/1995 | Frey | F01D 21/18 91/1 |
| 7,290,564 B2 | * | 11/2007 | Takahashi | F02M 25/0836 137/625.33 |
| 8,967,200 B2 | * | 3/2015 | Hayashi | F16K 47/10 137/625.33 |

* cited by examiner

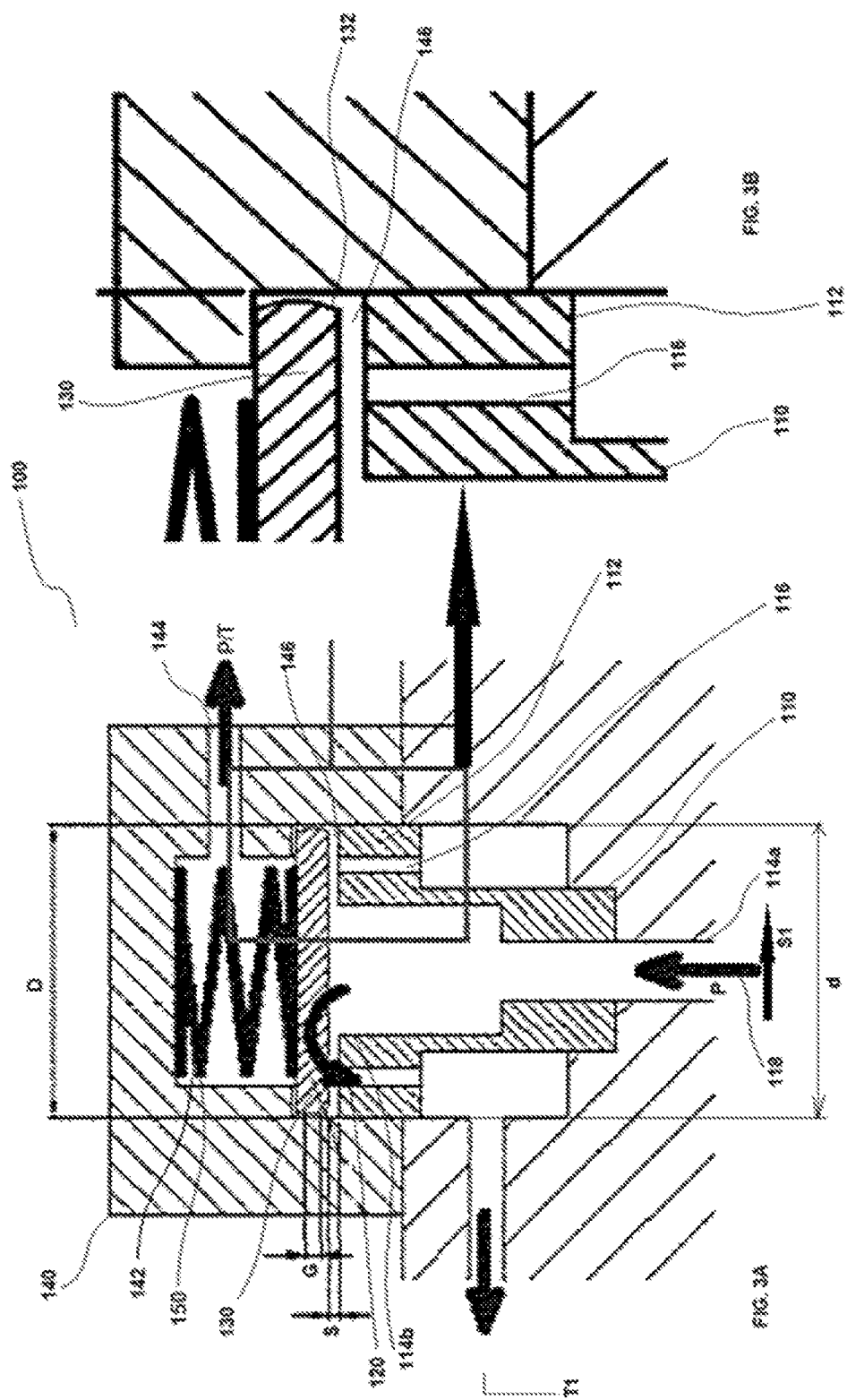

HIGH-FLOW VALVE ARRANGEMENT IN STEAM TURBINE SAFETY SYSTEM

BACKGROUND

Embodiments of the present invention generally relate to steam turbine safety systems, and more particularly to a high-flow valve arrangement in an electro-hydraulic safety control unit to discharge oil volume on instructions from the steam turbine safety system to actuate actuators to stop steam flow in steam turbines to shut-off.

BRIEF DESCRIPTION OF THE RELATED ART

A steam turbine safety system ensures steam turbine protection by utilizing a safety chain that has electro-hydraulic interface, which include valves.

An example of such a valve structure is shown in Prior Art FIG. 1, which is an on-the-shelf valve 10. Such on-the-shelf valve 10 is an oil-operated valve which includes a valve body 11 having a peripheral flange 12 which enables seating of a valve housing 13. The valve housing 13 includes an inlet/outlet port 13a. The valve body 11 also includes an inlet 11a and outlet 11b from where fluid, respectively, enters and exits. The valve 10 further includes a valve cartridge 14 disposed within the valve body 11. The valve cartridge 14 includes a hollow and elongated structure, wherein the hollow portion defines a chamber 14A. The port 13a allows the control of the positions of the cartridge 14 via the chamber 14A. When the steam turbine safety system, depending upon the safety requirement using a solenoid valve, pumps the oil to be entered via the port 13A, it exerts the pressure on the chamber 14A so as to close the valve 10 thereby stopping the flow of the fluid from the inlet 11A to the outlet 11B. Further, when the solenoid valve, pumps the oil to be exits via the port 13A, it releases the pressure on the chamber 14A so as to open the valve 10 thereby releasing the flow of the fluid from the inlet 11A to the outlet 11B. Further, the valve 10 may also include a spring 15, which may activate the cartridge when hydraulic energy is off.

Such on-the-shelf-valve 10 may have been successfully utilized for its desired requirement, however, have been always including a risk of jamming due to involvement of higher displacement, known as stroke (S1), of the cartridge 14 in the body 11, and requires adequate guidance (G1) due to larger elongated profile of the valve cartridge 14 and short diameter D1 thereof.

Accordingly, there exists a need for an improved high-flow valve arrangement in steam turbine safety system that overcomes the above problems.

SUMMARY OF THE INVENTION

The present disclosure discloses an improved high-flow valve arrangement in steam turbine safety system that will be presented in the following simplified summary to provide a basic understanding of one or more aspects of the disclosure that are intended to overcome the discussed drawbacks, but to include all advantages thereof, along with providing some additional advantages. This summary is not an extensive overview of the disclosure. It is intended to neither identify key or critical elements of the disclosure, nor to delineate the scope of the present disclosure. Rather, the sole purpose of this summary is to present some concepts of the disclosure, its aspects and advantages in a simplified form as a prelude to the more detailed description that is presented hereinafter.

An object of the present disclosure is to describe an improved high-flow valve arrangement in steam turbine safety system that reduces a risk of jamming for high reliability in an economical and feasible manner.

In one aspect of the present disclosure, a high-flow valve arrangement is provided. Such high-flow valve arrangement may be incorporated in an electro-hydraulic safety control unit to discharge oil volume on instructions from a steam turbine safety system. The discharged oil-volume may then be configured to actuate actuators to stop steam flow in steam turbines to shut-off. The high-flow valve includes a valve body having an integral radially extending flange at one end. The radially extending flange is adapted to configure a plurality of spaced-apart through holes. The valve body is configured to define, at other distal end, an inlet to allow fluid to enter there-through, and, outlets defined via the plurality of spaced-apart through holes to enable exit of the fluid therefrom.

The high-flow valve further includes a flat-circular plate cartridge movably disposed on the valve body at the flange to cover the outlets of a diameter 'D'. The flat-circular plate cartridge includes a non-jamming profile along edges. In one embodiment, the non-jamming profile of the flat-circular plate cartridge is adapted to include spherical edges to provide a clearance between adjacent surfaces along the peripheral seat of the biasing attachment.

Furthermore, the high-flow valve includes a valve housing having a chamber, an inlet/outlet port and a peripheral seat. The chamber is adapted to accommodate oil volume therein. Further, the inlet/outlet port is adapted to enable the oil volume to enter and exit therefrom. The peripheral seat is adapted to receive the plate cartridge and a portion of the valve body therealong. The plate cartridge is capable of being moved slight upwards or downwards, defining a very short stroke 'S', upon the increase or decrease of the oil volume in the chamber to open and close the outlets defined via the plurality of spaced-apart through holes to enable and stop the fluid flow therefrom.

The plate cartridge is designed to include very low stroke/diameter ratio (S/D) enabling substantially lower requirement of guidance 'G' of the plate cartridge upon the release or exert of force from the fluid.

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWINGS

The advantages and features of the present disclosure will better understood with reference to the following detailed description and claims taken in conjunction with the accompanying drawing, wherein like elements are identified with like symbols, and in which:

FIGS. 3A and 3B illustrate improved high-flow valve arrangements in steam turbine safety system, in accordance with an exemplary embodiment of the present disclosure.

Like reference numerals refer to like parts throughout the description of several views of the drawings.

DETAILED DESCRIPTION

For a thorough understanding of the present disclosure, reference is to be made to the following detailed description, including the appended claims, in connection with the above-described drawings. In the following description, for purposes of explanation, numerous specific details are set forth in order to provide a thorough understanding of the present disclosure. It will be apparent, however, to one skilled in the art that the present disclosure can be practiced without these specific details. In other instances, structures and devices are shown in block diagrams form only, in order to avoid obscuring the disclosure. Reference in this specification to "one embodiment," "an embodiment," "another embodiment," "various embodiments," means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be of other embodiment's requirement.

Although the following description contains many specifics for the purposes of illustration, anyone skilled in the art will appreciate that many variations and/or alterations to these details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. Further, the relative terms used herein do not denote any order, elevation or importance, but rather are used to distinguish one element from another. Further, the terms "a," "an," and "plurality" herein do not denote a limitation of quantity, but rather denote the presence of at least one of the referenced item.

Figure 2:
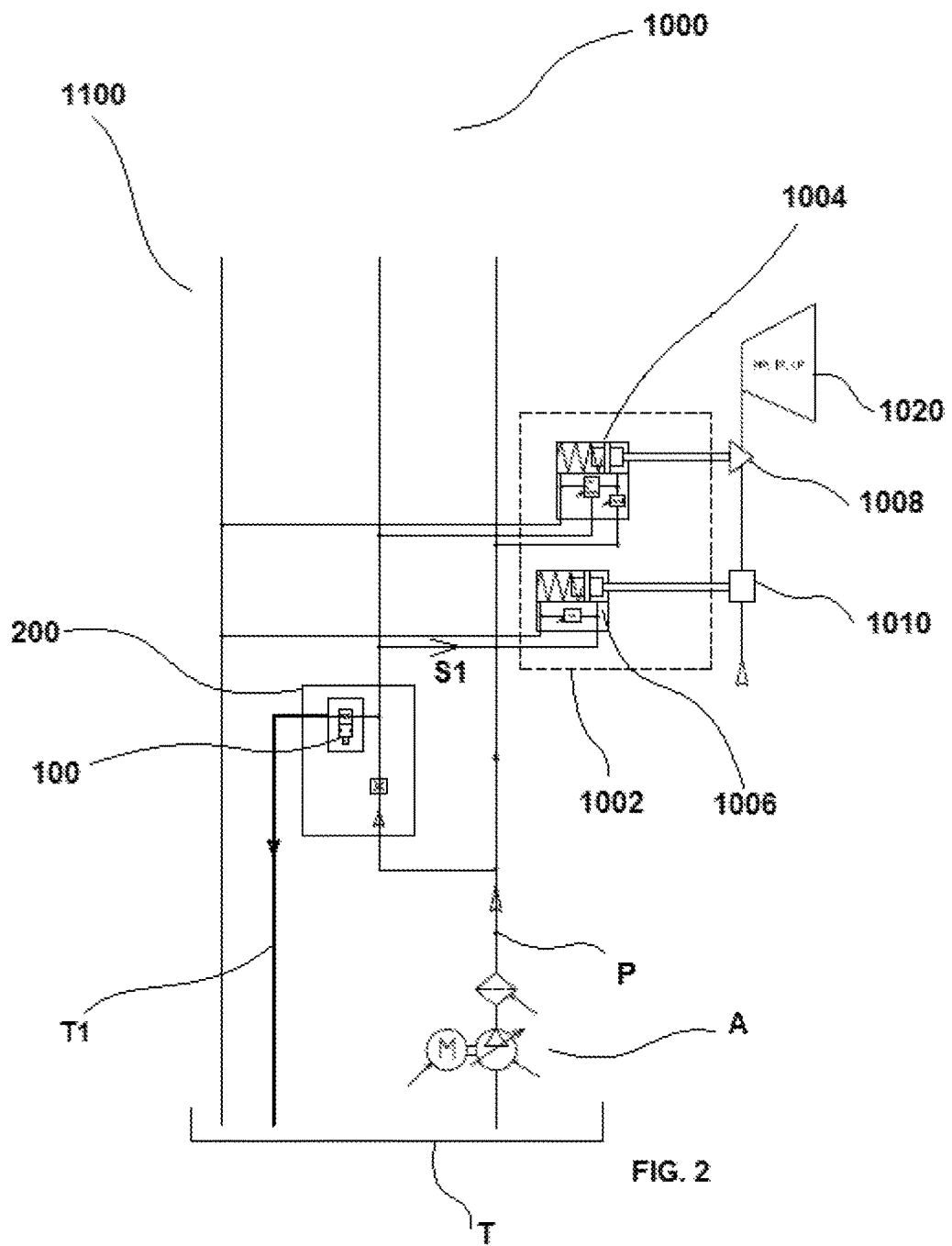
FIG. 2 illustrates a line diagram a safety chain in a steam turbine safety system that ensures steam turbine protection by utilizing an electro-hydraulic interface, which includes improved high-flow valve arrangement therein, in accordance with an exemplary embodiment of the present disclosure.

Referring to FIG. 2, which illustrates a line diagram of a steam turbine safety system 1000 including a safety chain arrangement 1100, which is depicted to illustrate only the hydraulic diagram. The safety chain arrangement 1100 also includes electric components but not shown herein. The safety chain arrangement 1100 ensures protection of steam turbine 1020. The safety chain arrangement 1100 may include one or more electro-hydraulic safety control units 200 and various other essential components, such as servomotors 1002, control actuators 1004/actuators 1006 and steam control valves 1008, to stop the steam turbine 1020 in case of requirement. The components, such as the servomotors 1002, control actuators 1004/actuators 1006 and steam control valves 1008 dependent on the action of the safety control unit 200 for stopping the steam turbine 1020 in case of emergency. The safety chain arrangement 1100 ensures protection of the steam turbine 1020 by de-energizing the electro-hydraulic safety control units 200 in case of critical situations, identified by the steam turbine safety system 1000. For that purpose, an improved high-flow valve arrangement 100 in the electro-hydraulic safety control unit 200 is incorporated to discharge oil volume on instructions from the steam turbine safety system 1000 to the servomotors 1002 to actuate control actuators 1004/actuators 1006 to stop/control steam flow by the control valves 1008/stop valve 1010 in steam turbines 1020 to shut-off the steam turbines 1020 and protect thereto from damage. Detailed description of the improved high-flow valve arrangement 100 will be made herein with referenced to FIGS. 2, 3A-3B, and 4A-4E.

In as much as the construction and arrangement of the electro-steam turbine safety system 1000 including the electro-hydraulic safety control unit 200 with the improved high-flow valve arrangement 100, various associated elements may be well-known to those skilled in the art, it is not deemed necessary for purposes of acquiring an understanding of the present disclosure that there be recited herein all of the constructional details and explanation thereof. Rather, it is deemed sufficient to simply note that as shown in FIGS. 2, 3A-3B and 4A-4E, in the steam turbine safety system 1000 including the hydraulic safety control unit 200 with the improved high-flow valve arrangement 100, only those components are shown that are relevant for the description of various embodiments of the present disclosure.

Referring now to FIGS. 3A and 3B, which is an enlarged view of a portion of FIG. 3A, the high-flow valve arrangement 100 includes a valve body 110, a flat-circular plate cartridge 130, and a valve housing 140 arranged and configured to each other to form the high-flow valve arrangement 100.

The valve body 110 extending between two distal ends 114A, 114B. The valve body 110 includes an integrally configured radially extending flange 112 at the end 114A. The flange 112 may have a diameter 'd.' Further, the radially extending flange 112 is adapted to configure a plurality of spaced-apart through holes 116. The valve body 110, defines, at the end 114B, an inlet 118 to allow fluid to enter there-through, and, defines, outlets 120, at the end 114a, via the plurality of spaced-apart through holes 116 to enable exit of the fluid therefrom.

The flat-circular plate cartridge 130 (plate cartridge 130) is adapted to be configured with the valve body 110. Specifically, the plate cartridge 130 is movably disposed on the valve body 110 over the flange 112 to cover the through holes 116 that defines the outlets 120. In an embodiment, the plate cartridge 130 includes a diameter 'D' to substantially match a diameter 'd' of the flange 112. The plate cartridge 130 includes a non-jamming profile along edges 132. In an embodiment, the non-jamming profile of the plate cartridge 130 is adapted to include spherical edges 132.

Further, the valve housing 140 includes a chamber 142, an inlet/outlet port 144 and a peripheral seat 146. The chamber 142 is adapted to accommodate the oil volume therein. The inlet/outlet port 144 is adapted to enable the oil volume to enter and exit therefrom. The peripheral seat 146 is adapted to receive the plate cartridge 130 and a portion of the valve body 110 therealong, thereby forming the assembly of the high-flow valve 100.

The plate cartridge 130 is capable of being moved slight upwards or downwards, defining a very short stroke 'S', upon the increase or decrease of the oil volume in the chamber 142 to open and close the outlets 120 defined via the plurality of spaced-apart through holes 116 to enable and stop the fluid flow therefrom. The short stroke 'S' is due to the flat and narrow height/thickness of the plate cartridge 130, which takes little displacement to open and close the through hole 116. When the steam turbine safety system 1000, depending upon the safety requirement using a solenoid valve 300 (shown in FIG. 4), pumps the oil or fluid to be entered via the port 144 into the chamber 144, it exerts the pressure on the plate cartridge 130 so as to close the valve 10 thereby stopping the flow of the fluid from the inlet 114A to the outlet 114B. Further, when the solenoid valve, pumps the oil/fluid to be exit via the port 144, the oil in the chamber 142 decreases that in-turn releases the pressure on the plate cartridge 130 so as to open the valve 10 thereby releasing the flow of the fluid from the inlet 114A to the outlet 114B. Further, the valve 10 may also include a spring 150, which may activate the cartridge only when hydraulic energy is off.

In an embodiment, the non-jamming profile of the plate cartridge 130 that includes the spherical edges 132 provides a clearance between adjacent surfaces along the peripheral seat 146.

In an operation, as described with reference to FIGS. 2 and 44-4E (in conjunction with FIGS. 3A and 3B), in case of critical situation, identified by the steam turbine safety system 1000, due to external order, such as electrical protection, reactor protection, auxiliaries protection, operator action, etc., safety signals are transmitted to the electro-hydraulic safety control units 200 in the safety chain arrangement 1100.

The electro-hydraulic safety control units 200, a line diagram illustration as shown in FIGS. 4A to 4E, include solenoid valves 300, high-flow valves 100, fluid circuit connection 'P', safety fluid circuit connection 'S1' and a fluid tank 'T.' The fluid circuit connection 'P' enables the fluid to flow from the power generation to the safety fluid circuit connection 'S1.' In addition 'P' enables the fluid to the port 144, via solenoid valves 300, to allow control of the position of the plate cartridge 130. Oil in the safety fluid circuit connection 'S1' and fluid in fluid circuit connection 'P' are same, however, nomenclature thereof are kept different so as to easily understandable by a person ordinary skilled in the art.

Figure 4A:
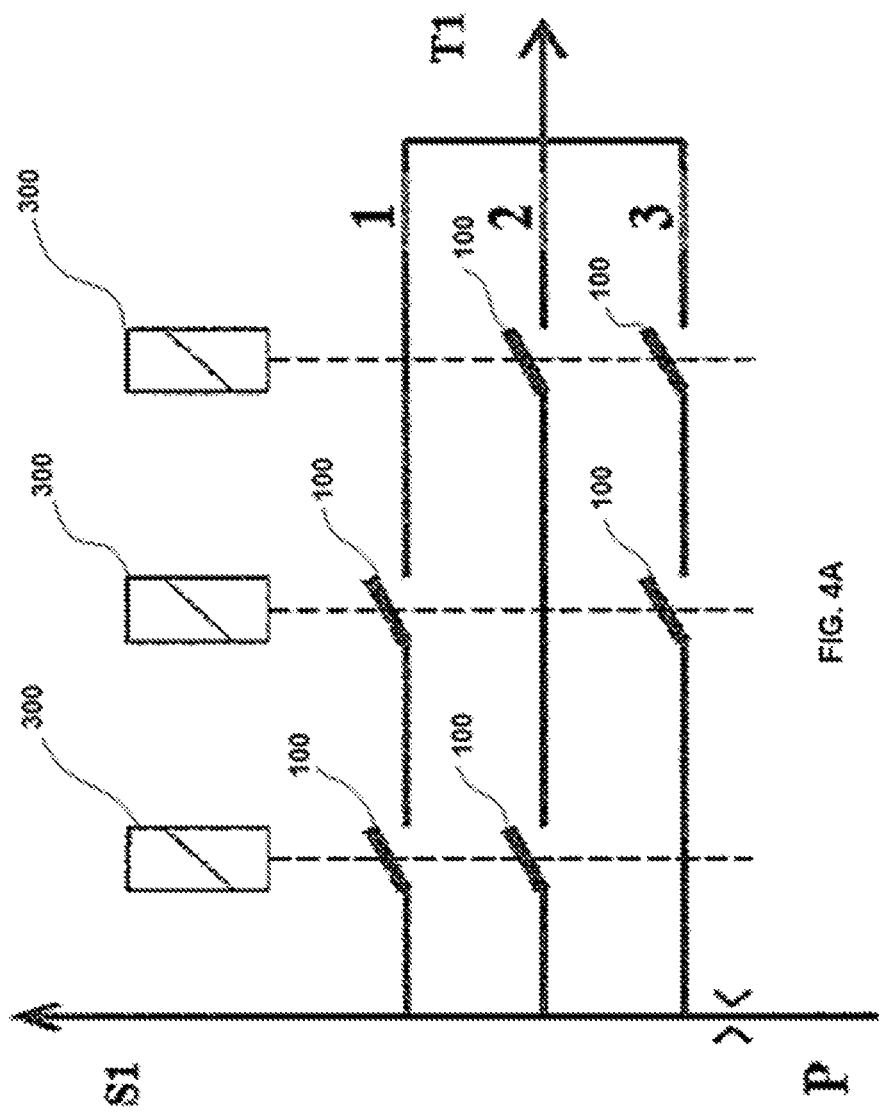
FIGS. 4A, 4B, 4C, 4D and 4E illustrate simplified electro-hydraulic safety control unit in the safety chain having the improved high-flow valve arrangement of the present invention, in accordance with an exemplary embodiment of the present disclosure.
Figure 4B:
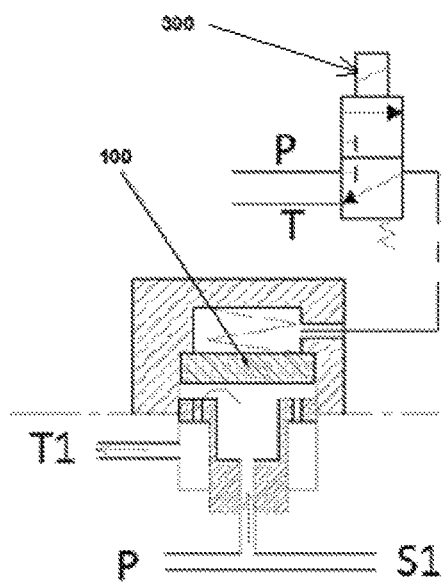
Figure 4C:
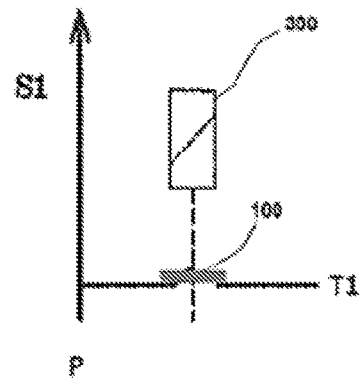

Referring to FIGS. 4B and 4C, when the safety signal from the steam turbine safety system 1000 is received by the electro-hydraulic safety control units 200, the solenoid valves 300 get off enabling the drop of the pressure along the safety circuit connection 'S1,' which in turn enables flow of oil from the port 144 releasing the pressure from the plate cartridge 130. With that effect, the plate cartridge 130 moves slight upward, defining a very short stroke 'S' in-turn, opening the through holes 116 to enable exit of the fluid, shown as 'T1,' therefrom to the fluid tank 'T'. For this purpose, motor, pump and filter arrangement 'A' (shown in FIG. 2) may be incorporated. The plate cartridge 130 is designed to include very low stroke/diameter ratio (S/D) enabling substantially lower requirement of guidance 'G' of the plate cartridge 130 upon force from the fluid.

Figure 4D:
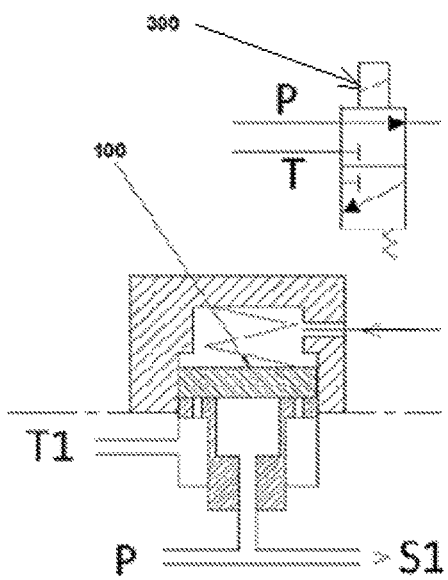
Figure 4E:
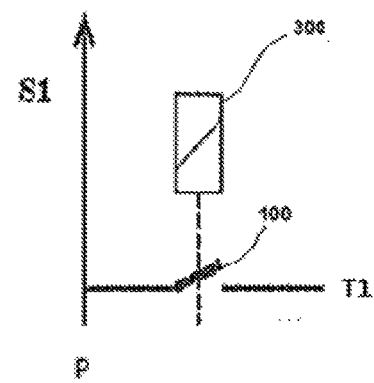

Similarly, as shown in FIGS. 4D and 4E, when the safety signal from the steam turbine safety system 1000 is off, the solenoid valves 300 gets on, enabling the increase of the pressure along the safety circuit connection 'S1,' which in turn enables entering of oil from the port 144, thereby exerting the pressure on the plate cartridge 130. With that effect, the plate cartridge 130 moves with the short downward stroke 'S,' in turn closing the plurality of spaced-apart through holes 116 to stop the fluid therefrom to the fluid tank 'T.'

In an additional embodiment, the high-flow valve arrangement 100 may include a spring member 150 disposed over the plate cartridge 130 within the chamber 142 to activate the plate cartridge 130, when oil flow is off.

Figure 1:
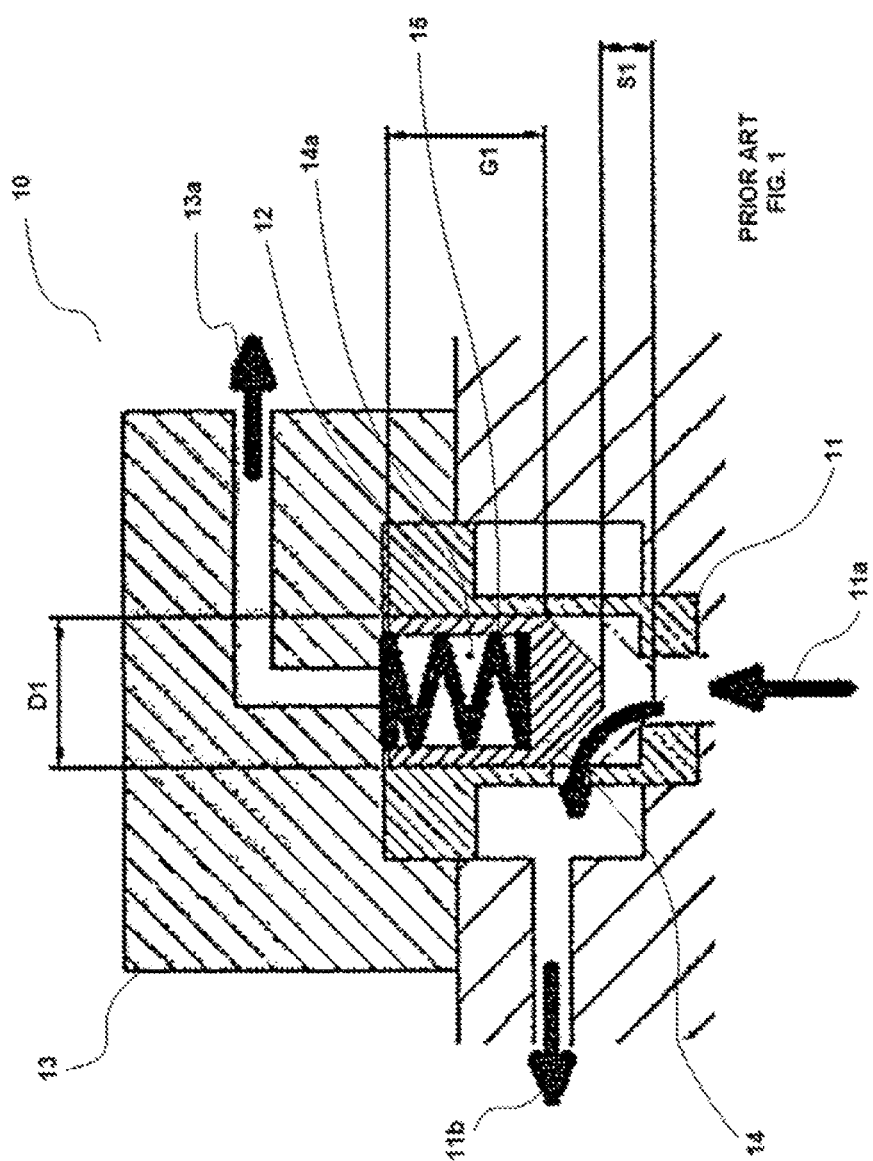
FIG. 1 illustrates an on-the-shelf valve according to a prior-art, in accordance with an exemplary embodiment of the present disclosure.

The high-flow valve 100 of the present disclosure is beneficial in various scopes such as described above. The valve that includes the plate cartridge is designed with a very short stroke, i.e. approximately 1.6 mm. In addition, the plate cartridge is also designed for a very low stroke/diameter ratio (S/D). Such a design of the plate cartridge leads to reduction of the guidance of the cartridge that precludes a requirement of a high guidance in the conventional valves, where due to high guidance requirement, there were always a risk of jamming of such conventional cartridge (as shown in FIG. 1). In the present disclosure, spherical edges of the plates and the low guidance provide unlockable profile for non-jamming. Furthermore, in the conventional cartridge due to higher guidance requirement, an accurate machining, i.e. perpendicularity and flatness of the cartridge, are importantly required, and if not achieved, may lead to leakage. However, in the present disclosure, such need may not be required thereby providing economic and tolerance advantages.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A valve in an electro-hydraulic safety control unit to discharge oil volume on instructions from a steam turbine safety system to servomotors, to actuate actuators to stop steam flow in steam turbines to shut-off the steam turbines, the valve comprising:
   a valve body defining opposite, first and second distal ends, the valve body having an integral radially extending flange at the first distal end, the radially extending flange having a diameter and defining a plurality of spaced-apart through holes, the valve body defining, at the second distal end, an inlet to allow fluid to enter there-through, and outlets defined via the plurality of spaced-apart through holes to enable exit of the fluid therefrom;
   a flat-circular plate cartridge movably disposed on the valve body at the flange to cover the outlets, the flat-circular plate cartridge having a diameter, the flat-circular plate cartridge having a non jamming profile along edges, wherein the non jamming profile of the flat-circular plate cartridge comprises spherical edges; and a valve housing having:
- a chamber to accommodate oil volume therein,
- an inlet/outlet port to enable the oil volume to enter and exit therefrom, and
- a peripheral seat to receive the plate cartridge and a portion of the valve body therealong, wherein the spherical edges provide a clearance between adjacent surfaces along the peripheral seat of the valve housing, wherein the plate cartridge is configured to move upwards or downwards, defining a stroke, upon the increase or decrease of the oil volume in the chamber to open and close the outlets defined via the plurality of spaced-apart through holes to enable and stop the fluid flow therefrom, and wherein the plate cartridge includes a stroke/diameter ratio design that enables a low guidance requirement of the plate cartridge upon force from the fluid.

2. The valve as claimed in claim 1, wherein the plate cartridge is designed to include a low stroke/diameter ratio enabling lower requirement of guidance of the plate cartridge upon the release or exert of force from the oil volume.

3. The valve as claimed in claim 1, further comprising a spring member disposed over the flat-circular plate cartridge with the chamber to activate the cartridge, when oil flow is off.

* * * * *